US007646737B2

(12) United States Patent
Shi

(10) Patent No.: US 7,646,737 B2
(45) Date of Patent: Jan. 12, 2010

(54) MULTIMODE WIRELESS DEVICE SYSTEM PROVISION VALIDATION AND ACQUISITION METHOD AND APPARATUS

(75) Inventor: Guangming Carl Shi, San Diego, CA (US)

(73) Assignee: Qualcomm Incorporated, San Diego, CA (US)

( * ) Notice: Subject to any disclaimer, the term of this patent is extended or adjusted under 35 U.S.C. 154(b) by 55 days.

(21) Appl. No.: 10/211,192

(22) Filed: Aug. 2, 2002

(65) Prior Publication Data

US 2004/0022216 A1 Feb. 5, 2004

(51) Int. Cl.
*H04W 72/00* (2006.01)
(52) U.S. Cl. .................. 370/310; 455/457; 455/464
(58) Field of Classification Search .......... 370/328, 370/329, 330, 338, 437, 465, 466, 310, 335; 455/552.1, 558, 422.1, 432.2, 435.2, 435.3, 455/407, 419, 421, 404.1, 401.2, 426.1, 432.1, 455/436, 437, 456.1, 456.3, 457, 464, 426, 455/432, 435, 552, 553
See application file for complete search history.

(56) References Cited

U.S. PATENT DOCUMENTS

| 5,655,003 | A | * | 8/1997 | Erving et al. | 379/418 |
|---|---|---|---|---|---|
| 5,734,980 | A | * | 3/1998 | Hooper et al. | 455/434 |
| 5,950,130 | A | * | 9/1999 | Coursey | 455/432.1 |
| 5,987,325 | A | * | 11/1999 | Tayloe | 455/435.2 |
| 5,999,811 | A | * | 12/1999 | Molne | 455/432.3 |
| 6,023,620 | A | * | 2/2000 | Hansson | 455/419 |
| 6,125,283 | A | * | 9/2000 | Kolev et al. | 455/552.1 |
| 6,606,491 | B1 | * | 8/2003 | Peck | 455/411 |
| 6,671,508 | B1 | * | 12/2003 | Mitsuoka et al. | 455/412.1 |
| 6,961,583 | B2 | * | 11/2005 | Moles et al. | 455/552.1 |
| 2008/0019294 | A1 | * | 1/2008 | Inoue et al. | 370/310 |

FOREIGN PATENT DOCUMENTS

| WO | 9960807 A1 | 11/1999 |
|---|---|---|
| WO | 0001187 A1 | 1/2000 |
| WO | 0027158 A1 | 5/2000 |
| WO | 0158190 A1 | 8/2001 |

OTHER PUBLICATIONS

International Search Report, PCT/US2003/024061 - International Search Authority - European Patent Office, Dec. 4, 2003.

(Continued)

*Primary Examiner*—Seema S Rao
*Assistant Examiner*—Mon Cheri S Davenport
(74) *Attorney, Agent, or Firm*—Bruce W. Greenhause; Darren M. Simon

(57) ABSTRACT

An apparatus and method are disclosed for system provisioning in a multimode wireless communication device. A multimode wireless communication device may store multiple system provision information internally, or combine system provision information stored internally with removable memory devices, which store additional system provision information. The multimode wireless device may simultaneously have access to a plurality of valid system provision information for a plurality of systems. The wireless device attempts to validate one of the plurality of stored system provision information using a hierarchy. The hierarchy may be established by a phone manufacturer or may be programmed by a service provider or a user. The wireless device attempts to validate system provision information based on the hierarchy. Once a system provision is validated, the device activates service or registers in the system. If a less desirable system is acquired, the device may periodically attempt to validate preferred systems.

29 Claims, 6 Drawing Sheets

OTHER PUBLICATIONS

International Preliminary Examination Report, PCT/2003/024061 - International Preliminary Examining Authority - US, Mar. 3, 2005.

Written Opinion. PCT/US2003/024061 - International Preliminary Examining Authority - US, Aug. 2, 2002.

* cited by examiner

MULTIMODE WIRELESS DEVICE SYSTEM PROVISION VALIDATION AND ACQUISITION METHOD AND APPARATUS

BACKGROUND OF THE INVENTION

1. Field of the Invention

The invention relates to multimode wireless communication devices. More particularly, the invention relates to system provisioning of multimode wireless communication devices.

2. Description of the Related Art

Wireless communication devices have become a common part of modern life. Examples of wireless communication devices that have experienced widespread adoption include pagers, wireless phones, cordless phones, wireless radios, and remote controls for a variety of consumer devices. However, wireless communication devices are often constrained to operate within a particular system. For example, numerous wireless phone system specifications exist and the corresponding phones, which are designed to operate within particular phone systems, are often unable to operate within alternative phone systems. These systems may be based on code division multiple access (CDMA), time division multiple access (TDMA), orthogonal frequency division multiplexing (OFDM), frequency modulation, or some other modulation techniques. As an example, a mobile phone configured to operate within a Global System for Mobile Communications (GSM) system may be inoperable in a CDMA system.

Additionally, several standards may define operability within a particular modulation type. A CDMA system may be designed to support one or more CDMA standards such as (1) the Telecommunications Industry Association (TIA)/Electronic Industries Association (EIA) "TIA/EIA-95-B Mobile Station-Base Station Compatibility Standard for Dual-Mode Wideband Spread Spectrum Cellular System" (the IS-95 standard), (2) the standard offered by a consortium named "3rd Generation Partnership Project" (3GPP) and embodied in a set of documents including Document Nos. 3G TS 25.211, 3G TS 25.212, 3G TS 25.213, and 3G TS 25.214 (the W-CDMA standard), (3) the standard offered by a consortium named "3rd Generation Partnership Project 2" (3GPP2) and embodied in a set of documents including "C.S0002-A Physical Layer Standard for cdma2000 Spread Spectrum Systems," the "C.S0005-A Upper Layer (Layer 3) Signaling Standard for cdma2000 Spread Spectrum Systems," and the "C.S0024 cdma2000 High Rate Packet Data Air Interface Specification" (the cdma2000 standard), and (4) some other standards.

A GSM system may be designed to support one or more GSM standards, such as the standards offered by the "3rd Generation Partnership Project (3GPP)" and embodied in the 3GPP specification where the term "3GPP specification" refers to all GSM specifications including those covering GSM Evolution (GSM EDGE), Global Packet Radio Service (GPRS), and GSM 3G. The 3GPP specification is provided in a set of documents provided by Technical Specification Groups (TSG) including specifications in series 01 through 13 for GSM only prior to Rel-4, series 21 through 35 for 3G/GSM R99 and later, and series 41 through 52 for GSM only for Rel-4 and later.

A wireless phone configured to operate in one of the above mentioned communication systems will typically have system provisioning information stored on the phone. System provisioning information normally includes the information required by the particular communication system before the phone is provided access to the system. The system provision information identifies a particular user and allows the communication system to track access, usage, and billing, for example. System provision information is used by the phone to allow communication with a specific network. The system provisioning information may be programmed into memory that is within the wireless phone. The memory may be a fixed memory device that is designed to be non-removable by the user. Alternatively, the wireless phone may support a removable memory card or device that contains the system provisioning information. A wireless phone configured to operate in a GSM system may support a Subscriber Identification Module (SIM) in the form of a SIM chip or a SIM card. For example, the SIM may operate in accordance with specification GSM 11.11, 11.12, 11.18, or 3G TS 31.101. Similarly, a wireless phone configured to operate in a CDMA communication system may support a Removable User Identity Module (R-UIM). The R-UIM may operate in accordance with specification 3GPP2 C.S0023. The SIM or R-UIM may be programmed with the system provisioning information required to allow the wireless phone to access the communication system.

It is desirable to allow a single wireless phone to operate within any communication system. However, different telephone systems utilize different system provision information. Additionally, different phone systems may have coverage areas that are mutually exclusive or that are overlapping.

For example, a first CDMA wireless communication system may require the system provision information set forth in the CDMA2000 specification. A second CDMA wireless communication system may also operate in accordance with CDMA2000 such that a wireless phone may operate in either communication systems with the same system provision information. However, the first and second CDMA communication systems may have mutually exclusive coverage areas. A third communication system may be a GSM system that requires system provision information that is different from the system provision information required by the CDMA systems. Additionally, the coverage area may be exclusive of, or may overlap, the coverage areas of the CDMA systems.

In order to allow a wireless device to operate in some or all of the different wireless communication systems, it would be advantageous for the device to resolve the system provision information and register in various communication systems. A device should be configurable to allow it to operate in various types of communication systems such that the device has a high probability of operating in a supported coverage area. The device should be able to interface with a removable memory device that may hold the system provision information. The device should also have the capability of operating in multiple systems using SIM or R-UIM modules.

SUMMARY OF THE INVENTION

A multimode wireless communication device stores one or multiple system provision information internally, or combines system provision information stored internally with one or more removable memory devices, which store additional system provision information. The multimode wireless device may simultaneously have access to a plurality of valid system provision information corresponding to a plurality of systems. The wireless device validates one of the plurality of stored system provision information using a hierarchy, or preferred system list. If no system provision is determined to be valid, the multimode device may enter an emergency service operation mode or a maintenance service mode.

A multimode device that has acquired a communication system may reestablish a communication. The multimode device may reestablish a communication system when an acquired system is lost, when status of a storage device having system provision information changes, or if the acquired system is not a preferred system. The multimode device determines which storage devices have valid system provision information and acquires a system according to a hierarchy or preferred system list. If no system provision is determined to be valid, the multimode device may remain in the current system or may enter an emergency service operation mode or a maintenance service mode.

In one embodiment, the multimode device performs a method of determining an operating mode. The method comprises retrieving first system provision information, determining whether the first system provision information is valid, retrieving second system provision information if the first system provision information is determined to be invalid, determining whether the second system provision information is valid, and activating a system mode corresponding to the second system provision information if the second system provision information is determined to be valid.

In another embodiment, the multimode device includes a memory having a plurality of system provision information stored therein and a processor electrically connected to the memory. The processor is configured to determine an operating mode of the multimode communication device in part by retrieving and determining validity of the plurality of system provision information. The processor retrieves and determines the validity of the system provision information according to a predetermined hierarchy, and the processor determines the operating mode of the multimode communication device based at least in part on a first valid system provision.

BRIEF DESCRIPTION OF THE DRAWINGS

The features, objects, and advantages of the invention will become more apparent from the detailed description set forth below when taken in conjunction with the drawings in which like reference characters identify correspondingly throughout and wherein.

DETAILED DESCRIPTION OF THE PREFERRED EMBODIMENT

Figure 1:
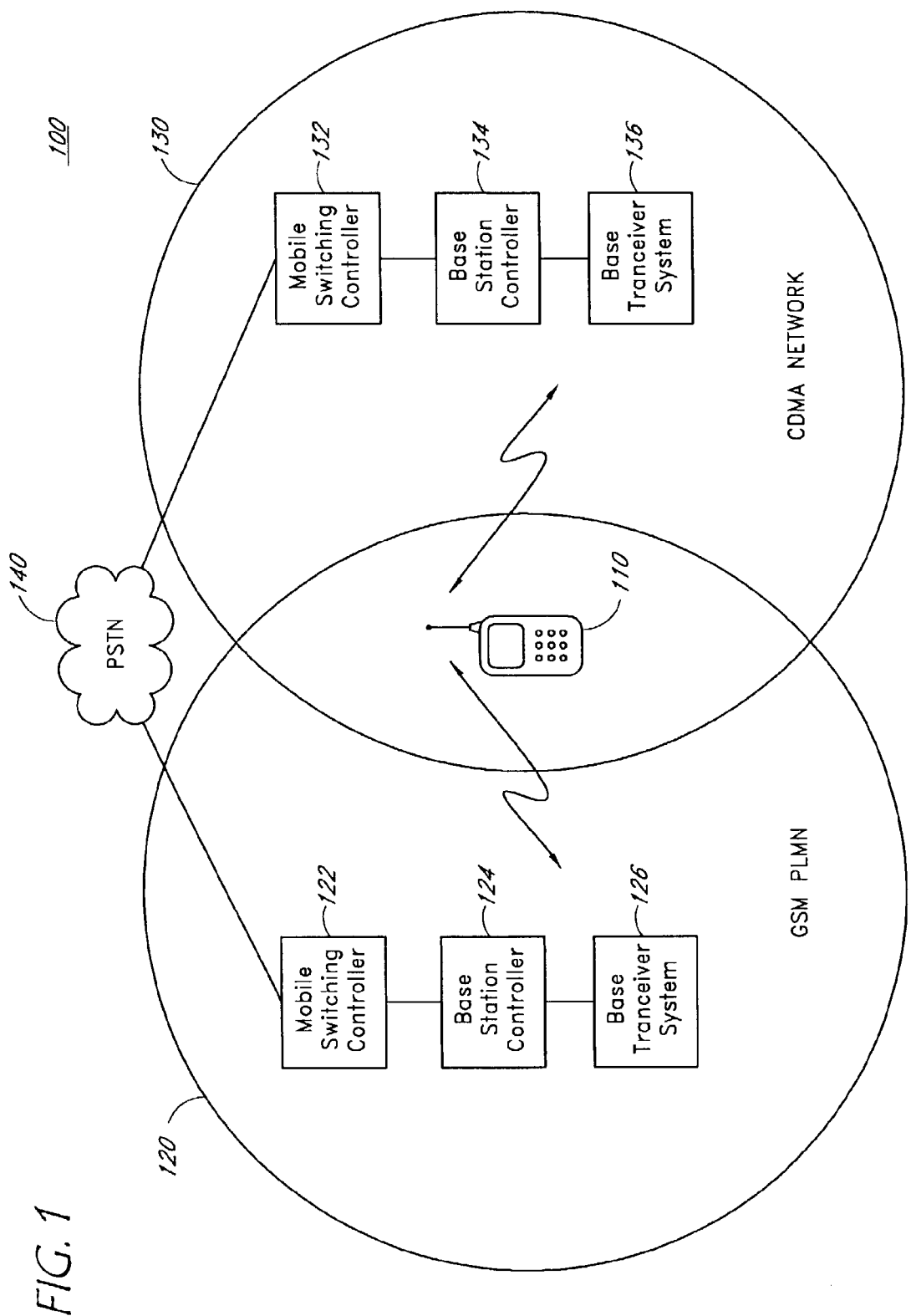
FIG. 1 is a functional block diagram of an embodiment showing a multimode wireless device operating in a multimode environment.

A device and method of validating and acquiring a communication system is disclosed. Thus, an embodiment of the invention is a multimode wireless device configured to access a plurality of different types of communication systems. For example, a multimode wireless phone may be configured to access a GSM telephone system as well as a CDMA telephone system. Within each communication system, the multimode wireless device may be configured to communicate over a plurality of networks using digital or analog communication techniques.

Each of the plurality of currently available communication systems operates in accordance with a corresponding system specification. The system specifications typically provide specifications relating to the appropriate system provision information that is required for a wireless device to operate on the system. The system provision information required for a first wireless communication system may not correspond with system provision information required in a second wireless communication system. A multimode wireless device typically cannot access more than one wireless system using a single set of system provision information. Thus, one embodiment of the invention includes a multimode wireless device that incorporates storage of a plurality of system provision information. The system provision information may be stored as sets of system provision information, with each set corresponding to the system provision information required for a particular communication system.

A multimode wireless device may include a plurality of storage media for the storage of the system provision information. The storage media may be internal to the multimode device or may be external to the multimode device. The information stored in the storage media may be permanent or may be erasable. The storage media may be, for example, Programmable Read Only Memory (PROM), Erasable PROM, Electrically Erasable PROM, Random Access Memory (RAM), Non-Volatile RAM, or some other type of storage media. Storage media that is external to the multimode device may be removable storage media.

The different wireless system specifications may define various types of storage media in which data, including system provision information, may be stored. For example, in a GSM wireless communication system, system provision information is typically stored in a Subscriber Identity Module (SIM). The term SIM includes modules configured to operate in GSM, Global Packet Radio Service (GPRS), Universal Mobile Telephone Systems (UMTS), Enhanced Data rates for GSM Evolution (EDGE), third generation GSM (3GSM), Wideband CDMA (WCDMA) or other GSM family communication systems. The SIM may be a Universal SIM (USIM). The SIM normally is inserted and removed from compatible mobile equipment to enable the mobile equipment to access the wireless communication system.

The SIM contains information which is unique and user specific. The organization and data contained in a SIM is typically defined in one or more of the system specification documents. For example, a GSM SIM may comply with system specification GSM 11.11. The SIM contains the system provision information used by the user device when registering or communicating with the GSM Public Land Mobile Network (PLMN).

For example, a SIM configured to operate in accordance with GSM 11.11 is arranged as one or more Dedicated Files (DFs) in conjunction with one or more Elementary Files (EFs). A particular DF (e.g. $DF_{GSM}$) may contain multiple EFs used in a GSM application. The EFs typically include an International Mobile Subscriber Identity (IMSI), identifying the subscriber. An EF also contains a secret ciphering key used for authentication. An EF includes a list of preferred PLMNs. Each PLMN in the EF may be listed as a Mobile Country Code in conjunction with a Mobile Network Code. A Mobile Directory Number and a Mobile Class Assignment may also be stored within the SIM. Another EF includes a list of forbidden PLMNs for which the user device does not automatically attempt access. Still another EF includes a list of emergency call codes. The system provision information may include IMSI and PLMN information. The SIM also includes other user information in other DFs and EFs.

In a CDMA wireless communication system, such as a CDMA2000 system, the system provision information is usually stored in a memory internal to the wireless device, or alternatively might be stored in a Removable User Identity Module (R-UIM). The CDMA wireless communication system may be an IS-95 compliant CDMA system, a CDMA 1× system, CDMA 3× system, or another CDMA wireless system. The R-UIM may be inserted and removed from compatible mobile equipment to enable the mobile equipment to access the CDMA network.

The R-UIM is normally configured according to a CDMA specification. For example, the R-UIM may comply with specification 3GPP2 C.S0023 entitled REMOVABLE USER IDENTITY MODULE FOR SPREAD SPECTRUM SYSTEMS. An R-UIM operating in accordance with this specification is configured similarly to a SIM. The R-UIM is arranged as a number of Dedicated Files (DFs) and a number of Elementary Files (EFs). A DF (DF_CDMA) is used to store information related to a CDMA application. An EF within the R-UIM stores an International Mobile Subscriber Identity (IMSI) that is related to a Mobile Identity Number (MIN). The information is referred to as IMSI_M. Another location within the R-UIM stores an IMSI that is not associated with a MIN. This information is referred to as IMSI_T. The R-UIM may store Mobile Country Code, Mobile Directory Number, Mobile Network Code, and Mobile Class assignment information. In addition, the R-UIM stores a Preferred Roaming List (PRL) that may include System Identification (SID) and Network Identification (NID) information. System provision information for a CDMA system may include IMSI, Mobile Country Code, Mobile Directory Number, Mobile Network Code, Mobile Class assignment, SID, and NID.

Alternatively, multiple system provision information may be stored in a single storage device. The storage device may be memory internal to the multimode device or may be a removable storage device such as a SIM or R-UIM. For example, both the GSM system provision information and the CDMA system provision information may be stored in one R-UIM card.

In another alternative, multiple different system provision information for a single operating mode may be stored in one or more storage devices. For example, first system provision information for a CDMA mode may be stored in internal memory and second system provision information different from the first system provision information, corresponding to a CDMA mode, may be stored in R-UIM.

Embodiments of the invention include multimode wireless devices that are configured to operate in a plurality of wireless systems by incorporating multiple storage devices, each storing one or more sets of system provision information. The multimode wireless device may, for example, include NV-RAM for storage of system provision information related to a CDMA wireless system and a similar access to a GSM system. The system provision information in NV-RAM may be programmed by a service provider at the point of sale of the wireless device. Additionally, the wireless device may provide provisions for both a SIM as well as an R-UIM. An R-UIM containing system provision information may also be inserted into the mobile device to allow the device to communicate with three different types of systems. The R-UIM may include system provision information that is different from system provision information stored within any other storage device in communication with the mobile device.

The device and method disclosed herein allows a mobile device to interface with multiple storage devices that store system provision information in order to access a plurality of wireless systems. The device and method effectively account for the possibility of having one or more storage devices providing one or more sets of system provision information.

A multimode device 110 configured with some or all of the methods and devices disclosed herein is shown in FIG. 1. The multimode device 110 is shown operating in a multiple mode communication system 100.

The multimode device 110 may be in a coverage area 120 supported by a first wireless communication system. For example, the first wireless communication system may be a GSM system such as the GSM Public Land Mobile Network (PLMN). The illustrated GSM PLMN comprises a GSM Base Transceiver System (BTS) 126 connected with a GSM Base Station Controller (BSC) 124 which is in turn connected to a GSM Mobile Switching Controller (MSC) 122. The GSM MSC 122 is in communication with a Public Switched Telephone Network (PSTN) 140 to route calls from the wireless network to wired telephones.

The multimode device 110 may communicate with the GSM BTS 126 when the multimode device 110 is operating in GSM mode. The multimode device 110 communicates with the GSM BTS 126 in accordance with the appropriate GSM system specification according to the specified GSM air interface parameters.

The GSM BTS 126 typically defines a cell having a coverage area smaller than the GSM PLMN coverage area 120. Typically, a plurality of GSM BTS's 126 are used in the GSM PLMN. One or more GSM BTS's 126 may be connected to a GSM BSC 124. The GSM BSC 124 is used to control the operation of the one or more GSM BTS 126. The GSM BSC 124 may, for example, handle the handoff between GSM BTS 126 within the system. The GSM BSC 124 may also handle the set up and tear down of radio channels in the GSM system.

One or more GSM BSC's 124 are connected to the GSM MSC 122. The GSM MSC 122 acts like a normal switching node of the PSTN 140, and in addition provides functionality needed to support the multimode device 110. The functions may include registration, authentication, MSC handoffs, and call routing to a roaming subscriber. The GSM MSC 122 also provides the interface from the GSM network to the PSTN 140. Thus, a multimode device 110 operating in the GSM PLMN area 120 could easily communicate with a device connected to the PSTN 140.

The multimode device 110 normally comprises a mobile device, such as a cellular telephone connected to a SIM. The SIM typically inserts into a connector or slot provided on the mobile device. The SIM provides personal mobility, so that a user can have access to subscribed services without regard to the use of specific mobile device. The mobile device may be generic and may be configured using the information stored within the SIM. That is, the mobile device may not be configured to operate within any particular GSM network or with any particular set of services or service provider. However, the mobile device is uniquely identified by an International Mobile Equipment Identity (IMEI).

The IMEI identifying the mobile device and the IMSI stored within the SIM are independent. The SIM may incorporate a password or personal identity number to protect against unauthorized use.

The multimode device 110 may also be configured to operate in a CDMA network with a corresponding CDMA network coverage area 130 that overlaps with the GSM PLMN coverage area 120. The CDMA network may be configured using a structure that is very similar to the structure used by the GSM PLMN. However, the actual interfaces and protocols used in the CDMA network may be very different from those used in the GSM PLMN. Thus, a device configured to operate in the GSM system may not, and typically does not, have the ability to operate in the CDMA system.

However, the multimode device 110 is designed to operate in more than one communication system. The multimode device 110 communicates with a CDMA BTS 136 when communicating with the CDMA network. The communication between the multimode device 110 and the CDMA BTS 136 is defined in one or more CDMA system specifications. The multimode device 110 typically communicates with the CDMA BTS 136 over a radio channel using a defined air interface. As was the case for the GSM BTS 126, the CDMA BTS 136 typically defines the coverage area of a cell within the CDMA network. The CDMA network typically includes a plurality of CDMA BTS 136 configured to provide the complete CDMA coverage area 130.

Each CDMA BTS 136 is connected to a CDMA BSC 134. More than one CDMA BTS 136 may be connected to the same CDMA BSC 134. The CDMA BSC 134, in a function similar to that of the GSM BSC 124, controls the CDMA BTS 136 to which it is connected. The CDMA BSC 134, for example, may control the handoffs between CDMA BTS 136.

The CDMA BSC 134 is in turn connected to a CDMA MSC 132. More than one CDMA BSC 134 may connect to the same CDMA MSC 132. The CDMA MSC 132 provides functions needed to support the multimode device 110. The functions may include registration, authentication, MSC handoffs, and call routing to a roaming subscriber. The CDMA MSC 132 also provides the interface from the CDMA network to the PSTN 140. Similar to the case in the GSM PLMN, the CDMA MSC 132 is connected to the PSTN 140.

The multimode device 110 accesses CDMA system provision information stored in storage devices connected to the multimode device 110. The CDMA system specifications allow for a number of storage devices where system provision information may be stored. For example, system provision information is usually stored in memory that is internal to the multimode device 110. The service provider may program the internal memory at the point of sale. Alternatively, a service provider may program the internal memory when service for the multimode device 110 is desired, or if a user desires a change in service provider. Alternatively, the system provision information may be programmed into the internal storage device during over the air service provisioning (OTASP). The storage device may also be programmed during over the air parameter administration.

The multimode device 110 may also provide support for an R-UIM. The R-UIM would store system provision information that is used by the mobile device 110 when accessing the CDMA network. A multimode device 110 operating within an overlapping GSM PLMN coverage area 120 and a CDMA network coverage area 130 may prefer one communication system over another. Accordingly, one embodiment of the invention is a mobile device that determines if valid system provision information is available for a preferred communication system. The mobile device may then acquire the desired communication system or if it is not available, attempt to connect with a less desirable communication system.

Figure 2:
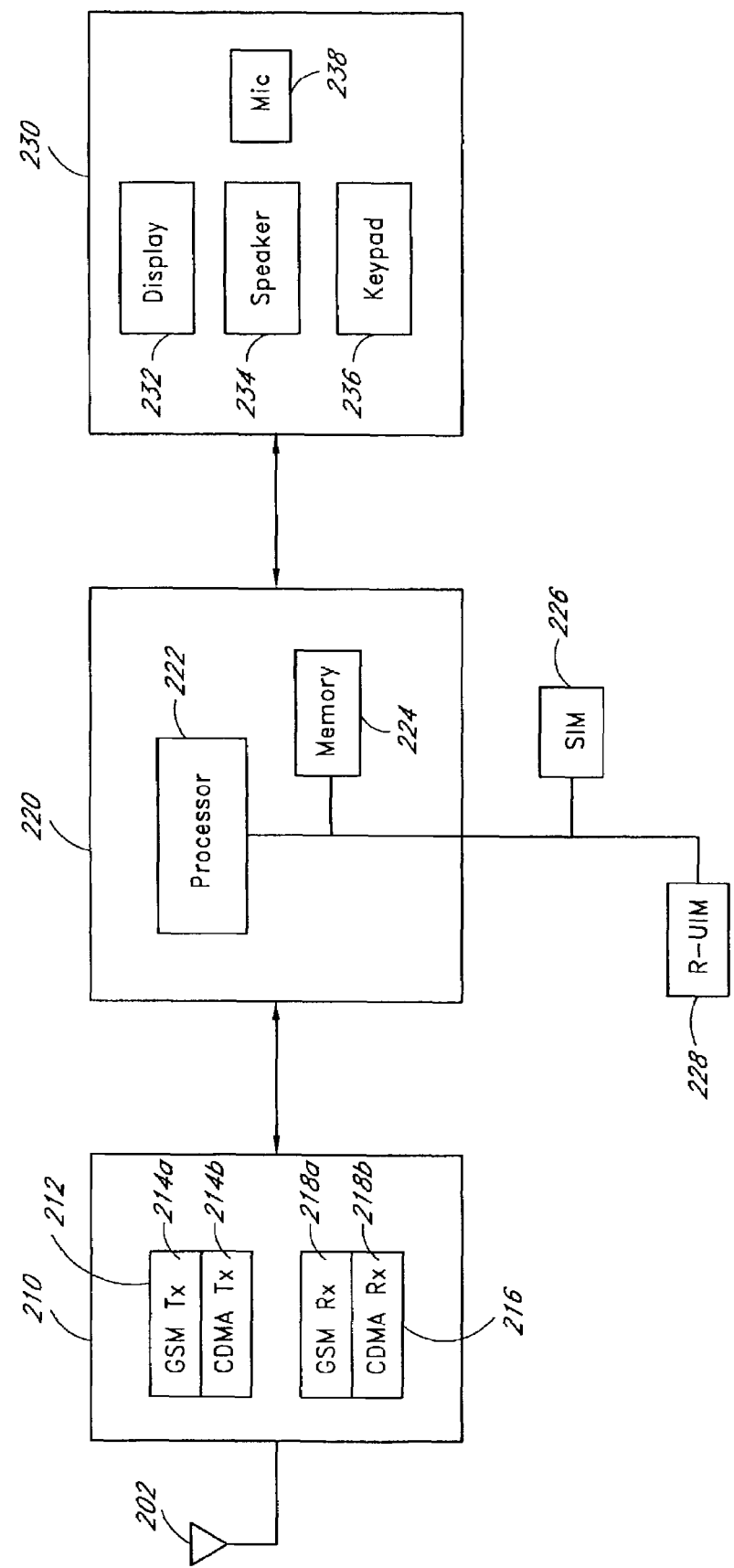
FIG. 2 is a functional block diagram of an embodiment showing a wireless device configured to interface with a plurality of memory devices.

A functional block diagram of one embodiment of the multimode device 110 is shown in FIG. 2. The multimode device 110 may be any type of wireless device, such as a wireless telephone, pager, or cordless phone, capable of operating in multiple communication systems.

The multimode device 110 may be described as having three basic functional blocks, an RF transceiver 210, a baseband processor 220, and a user interface 230. An antenna 202 may be used as the interface between a wireless channel and the remaining blocks of the multimode device 110. Although only one antenna 202 is shown, a multimode device 110 may implement more than one antenna. When more than one antenna is used, each antenna may operate in a distinct frequency spectrum, or the multiple antennas may operate in overlapping frequency spectrums. Where the wireless channel is not a Radio Frequency (RF) link, the interface may be some other type of device, such as an electromechanical transducer or an optical interface.

Signals received by the multimode device 110 are coupled from the antenna 202 to the RF transceiver 210. In a complementary fashion, signals to be transmitted by the multimode device 110 are coupled from the RF transceiver 210 to the antenna 202.

The RF transceiver 210 comprises a transmitter 212 and a receiver 216. Signals received by the multimode device 110 are coupled from the antenna 202 to the receiver 216 within the RF transceiver 210. The receiver 216 typically filters, amplifies, and downconverts the received signal to a received baseband signal having a desired bandwidth and amplitude. The receiver 216 may also perform demodulation of the received RF signal. The receiver 216 may be capable of processing signals from a plurality of frequency bands. For example, the receiver 216 may receive signals from a GSM band as well as from a CDMA band. If the receiver 216 is designed to receive signals from a plurality of frequency bands, the receiver 216 may implement a single tunable receiver or a plurality of receive paths. Alternatively, the receiver 216 may comprise a plurality of receivers 218a-218b. Each of the receivers, 218a-218b, may independently filter, amplify, downconvert, and demodulate one of the plurality of received signals. For example, a first receiver 218a may be configured to filter, amplify, and downconvert signals received from a GSM system. A second receiver 218b may be configured to receive communication signals from a CDMA system. If there are more than one receiver or more than one receive path, the baseband signals from each receiver or receive path are coupled to the baseband processor 220. The baseband signals may be combined into a single path, multiplexed on a single path, or provided on one or more distinct paths to the baseband processor 220.

Baseband signals that are to be transmitted are coupled from the baseband processor 220 to the transmitter 212 within the RF transceiver 210. The transmitter 212 preferably filters, amplifies, and upconverts the transmit baseband signals into transmit RF signals that are coupled to the antenna 202. The transmitter 212 may also modulate an RF signal with the transmit baseband signal. The transmit RF signals are then broadcast over the RF channel to an intended destination. The intended destination may be a single device or may be a plurality of devices. Additionally, one or more baseband signals may be upconverted to one or more RF frequency bands for transmission. The multiple RF frequency bands may be distinct or may overlap. As was the case with the receiver 216, the transmitter 212 may be configured as a single transmitter, a plurality of transmitters 214a-214b, or a plurality of transmit paths. Each of the transmitters 214a-214b may separately filter, upconvert, and amplify a baseband signal. For example, a first transmitter 214a may receive baseband signals and process those signals for transmission to a GSM base station. A second transmitter 214b may be configured to transmit a signal to a CDMA base station.

The baseband processor 220 typically operates on both the transmitted and received baseband signals. The baseband processor 220 may also perform functions local to the multimode device 110. The local functions may include retrieving and authenticating system provision information stored in one or more storage devices. These local functions may also include receiving and storing phone book entries, manipulating files stored within the multimode device 110, and managing various interfaces to user devices. The baseband processor 220 typically comprises a processor 222 and a memory 224. The processor 222 may comprise one or more processors. Similarly, the memory 224 may comprise one or more storage devices. A series of instructions or program may be stored in the memory 224 that may be read by the processor 222. The instructions or program may direct the processor 222 to perform various signal processing functions, including some or all of the system provision related functions.

The baseband processor 220 may further process the received baseband signals. For example, the baseband processor 220 may filter, amplify, demodulate, detect, or correct the received baseband signal. As further examples, the baseband processor 220 may deinterleave the baseband signal, apply correction using forward error correction techniques, or may synchronize the baseband signal to a time reference. The processed received baseband signals may be control signals used by the multimode device 110 or may be signals that are intended for a user of the multimode device 110 such as voice or data signals. The baseband processor 220 couples signals intended for the user to a user interface 230.

Signals to be transmitted by the multimode device 110 are typically processed by the baseband processor 220. The baseband processor 220 may format input signals into baseband signals that are then coupled to the RF transceiver 210. The baseband processor 220, for example, may interleave signals, encode signals with forward error correction, filter signals, modulate signals, or otherwise process signals. The signals provided to the baseband processor 220 for transmission may be generated internally by the multimode device 110 or may be coupled to the multimode device 110 using the user interface 230.

The user interface 230 provides means for conveying received signals to the user and also provides means for coupling signals from the user to the multimode device 110. The means for coupling the signals to the user may include, but are not limited to, an audio device such as a speaker 234 or other transducer, a display 232, which may be a character display, segment display, bit mapped display, or indicators, an electrical connection for coupling electrical signals to a corresponding user device, a mechanical device such as a vibration source to indicate an incoming message, or any other suitable means for communicating information from the multimode device 110 to a user or user device. The means for coupling signals from the user to the multimode device 110 may include, but are not limited to, a microphone 238, a keypad 236, a touch screen, an electrical connection, an optical input, or any other suitable means for coupling user signals to the multimode device 110.

System provision information may be stored in the memory 224 that typically is coupled to the processor 222 in the baseband processor 222. However, the multimode device 110 may also have provisions for a SIM 226 or R-UIM 228 or both. The multimode device may also provide a connection for one or more external removable storage devices (not shown). The multimode device 110 may provide a connector, plug, socket, or card slot that interfaces with the SIM 226. Additionally, the multimode device 110 may include a connector, plug, socket, or card slot that interfaces with an R-UIM 228. The multimode device 110 may also provide an interface for some other type of removable storage device (not shown) in which system provision information may be stored.

The multimode device 110 may provide a single interface for removable storage devices or may provide multiple interfaces for simultaneous connection with multiple removable storage devices.

The portable nature of the SIM 226, R-UIM 228, and removable storage device allows the device to be removed from the multimode device 110. Thus, the multimode device 110 must verify that a storage device, whether SIM 226, R-UIM 228, or some other removable storage device, is connected to the multimode device 110. The multimode device 110 also needs to validate and authenticate the system provision information stored within the removable storage device. The multimode device 110 also needs to determine to which communication system it may acquire and register.

As discussed above, the memory 224, SIM 226, and R-UIM 228 preferably store system provision information. The system provision information stored in the storage devices may be valid for some communication systems and invalid with others. For example, system provision information stored within a SIM 226 may be valid for a GSM system but may not be valid for a CDMA system. Similarly, system provision information stored within an R-UIM 228 may be valid for a CDMA system and invalid for a GSM system.

The multimode device 110 determines the communication system and mode in which it operates by initially determining how many storage devices contain system provision information. The multimode device 110 may determine if one or more removable storage devices are available. The multimode device 110 may determine if a particular storage device is functional. The multimode device 110 may also determine if system provision information is available in an internal memory 224. The multimode device 110 then determines if the various system provision information is valid. If the multimode device 110 determines that valid system information is available, it enters a normal operating mode and acquires the system with the valid system provision information. If no system provision information is determined to be valid, the multimode device 110 may enter an emergency operation mode or a maintenance operation mode. The multimode device 110 may determine the presence of a first storage device, determine the presence of system provision information stored within the first storage device, and validate the system provision information stored in the first storage device before performing the same functions for another storage device. Thus, the multimode device 110 may attempt to operate in a particular mode according to a particular order or hierarchy.

For example, upon power up, or when removable storage devices are inserted or removed from the multimode device 110, the multimode device 110 may determine the preferred system mode in which it will operate. The multimode device 10 first determines if the internal memory 224 contains system provision information. If it does, the multimode device 110 next determines if the system provision information is valid. If the system provision information is valid, the multimode device 110 enters the mode corresponding to the system provision information stored in the memory 224.

In this example, if the memory 224 does not contain system provision information, or if the system provision information is determined to be invalid, the multimode device 110 next determines if the R-UIM 228 is present. If the R-UIM 228 is inserted into the multimode device 110, the multimode device 110 determines the presence of system provision information and whether the system provision information is valid. If the R-UIM 228 is not present, or if it does not contain any valid system provision information, the multimode device 110 repeats the process with the SIM 226. However, if it is valid, the multimode device 110 enters the proper mode to communicate using the system corresponding to the valid provisioning information. If the multimode device 110 determines that no valid system provision information is contained within any of the available storage devices, the multimode device 110 is configured to enter an emergency service operation mode or a maintenance service mode. In the emergency service operation mode, the multimode device 110 may only make emergency calls on one of the available communication systems. In maintenance service mode, the multimode device 110 indicates carrier repair service is required. The multimode device 110 may be unable to communicate with any system in maintenance service mode.

The order in which the multimode device 110 checks for storage devices, and attempts communication modes in which to operate, may be determined in a variety of ways. Thus, in one embodiment of the invention, the multimode device is configured to allow a user to set preferences for the system modes. For example, the user may prefer a CDMA network to a GSM PLMN. The multimode device 110 would then attempt to first validate CDMA system provision information stored in the memory 224 and R-UIM 228 before attempting to validate GSM system provision information stored in the SIM 226. Alternatively, the multimode device 110 may be configured to allow the user to choose an "Automatic" preference mode. In "Automatic" preference mode the multimode device 110 attempts to operate in a mode according to a predetermined preference list or hierarchy.

Alternatively, the system mode preferences may be determined by a manufacturer, service provider, or carrier. A particular service provider may program the multimode device 110 to prefer one system to another. Thus, the service provider may determine the hierarchy of system mode preferences.

Figure 3:
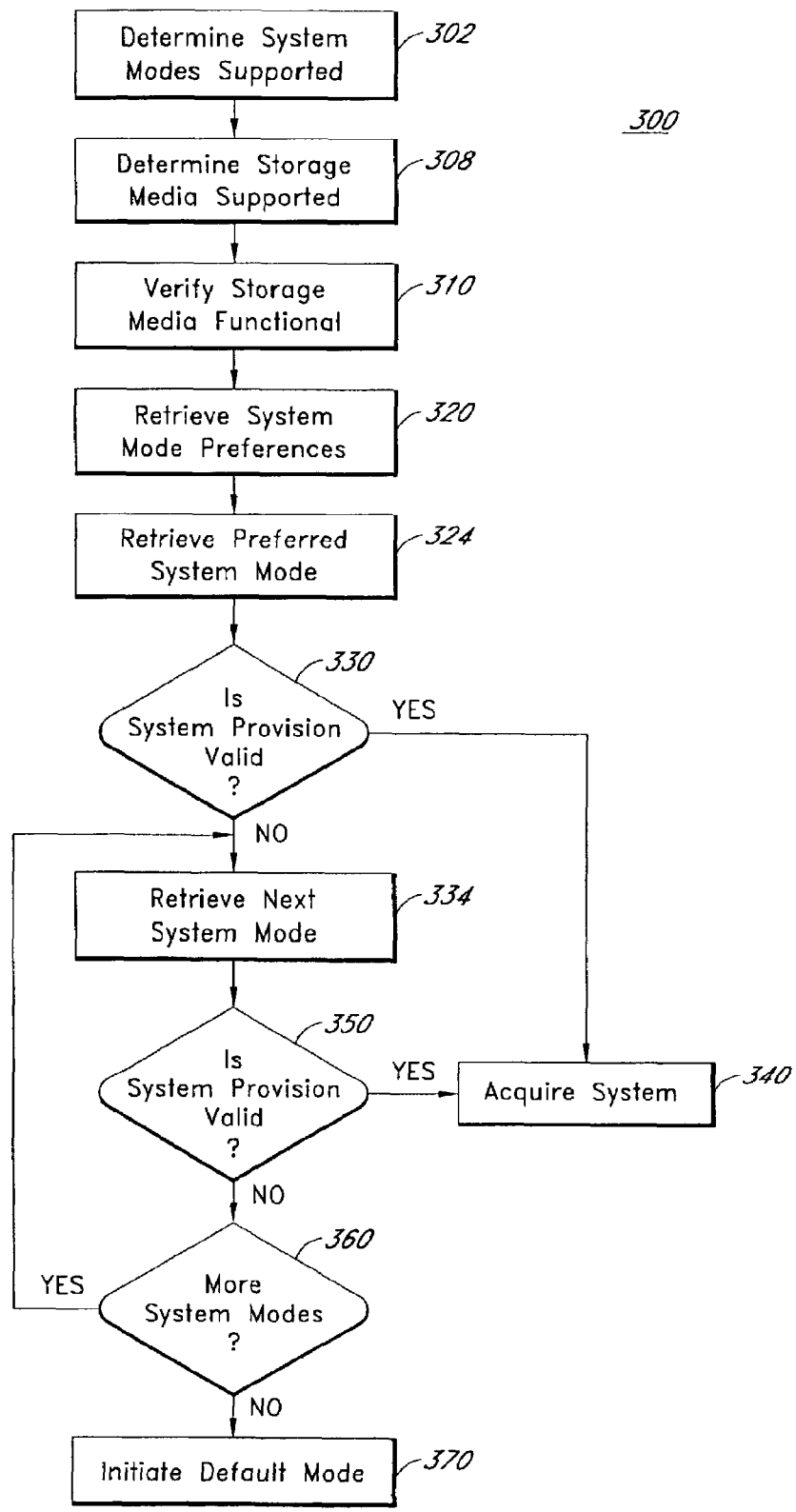
FIG. 3 is a flowchart showing an embodiment of a method of determining a communication system to which acquisition is attempted.

FIG. 3 shows a flowchart of one embodiment of a method 300 acquiring a communication system. The multimode device, using a processor and storage devices in communication with the processor, may perform this method 300 upon power on or if the status of a storage device changes. The status of a storage device may change, for example, when a removable storage device is inserted or removed from the multimode device.

In block 302, the multimode device initially determines which system modes the multimode device supports. This determination may be performed as part of the initial system start up functions by reading a stored list of supported system modes. The method 300 proceeds to block 308 where the multimode device determines what type of storage media is supported. The multimode device may support internal storage media, SIM, and R-UIM, for example. Each of the different types of storage media supported may store system provision information. Of course, the invention is not limited to only storing system provision information on these specific types of media.

The method 300 proceeds to block 310 where the multimode device determines whether each storage media is functional. Although internal memory may be assumed to be functional, removable storage media, such as SIM or R-UIM, may be removed from the multimode device or may be damaged or otherwise non-functional.

The method 300 then proceeds to block 320 where the multimode device retrieves a list of system mode preferences. The system mode preferences may be in a predetermined location in memory and the act of retrieving the list may comprise addressing a pointer to a first location in the list. The system mode preferences determine the hierarchy that the multimode device uses in attempting to acquire a communication system. The system mode preferences may be stored in any of the storage media and may be entered by the user, service provider, or manufacturer.

Once the system mode preferences are retrieved, the method 300 proceeds to block 324 where the multimode device retrieves the preferred system mode. The preferred system mode may indicate which of the storage media or which provisioning information is to be accessed first. At decision block 330 of the method 300, the multimode device determines whether the system provision indicated by the preferred system mode is valid. The multimode device retrieves the system provision indicated by the preferred system mode and performs the validation as required by the particular system mode. For example, a GSM operating mode may require a valid IMSI and PLMN. System provision information may be determined to be invalid if the storage media is determined to be non-functional. System provision information may also be determined to be invalid if the system provision content stored in the storage media does not pass a validity check.

If the system provision information is determined to be valid, the method 300 proceeds to block 340 where the multimode device acquires the system corresponding to the provision information.

If the system provision is determined not to be valid, the method proceeds to block 334 where the multimode device retrieves the next system mode from the list from the preferences list. The method 300 then proceeds to decision block 350 and the multimode device determines whether the newly retrieved system mode has corresponding system provision information that is valid. If the system provision is determined to be valid, the method 300 proceeds to block 340 and the multimode device acquires the designated system. If, in decision block 350, the system provision is determined not to be valid, the method 300 proceeds to decision block 360.

In decision block 360, the multimode device determines if there are more system modes in the system mode preferences list. If there are more modes, the method 300 returns to block 334 and the multimode device retrieves and verifies the next system mode. If system provision information for all system modes have been found to be invalid, the method 300 proceeds to block 370 where the multimode device initiates a default operating mode. As discussed earlier, the default operating mode may be an emergency operation mode or may be a maintenance operation mode.

Figure 4A:
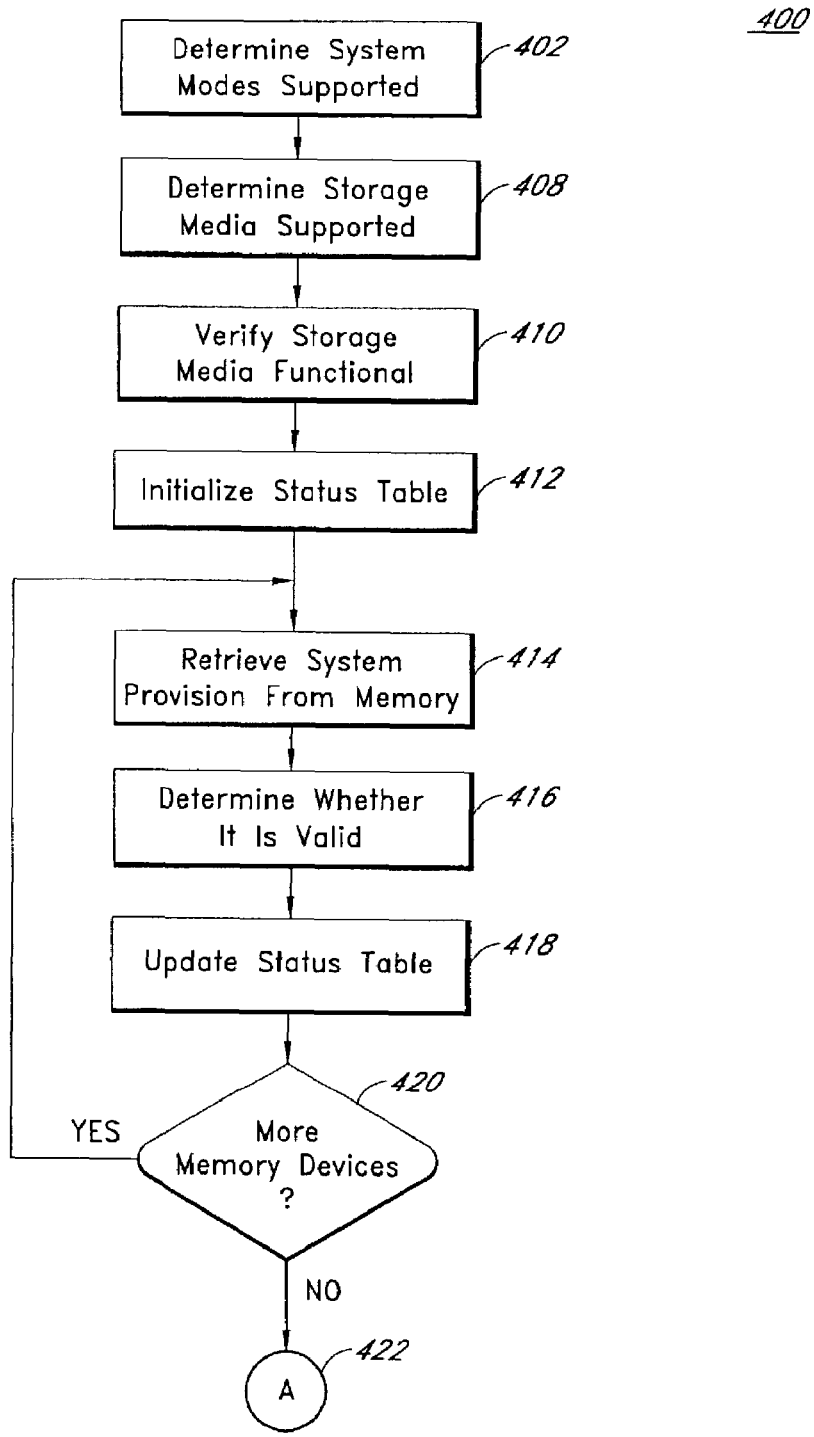
FIGS. 4A-4B are flowcharts showing an alternative embodiment of a method of determining a communication system to which acquisition is attempted.
Figure 4B:
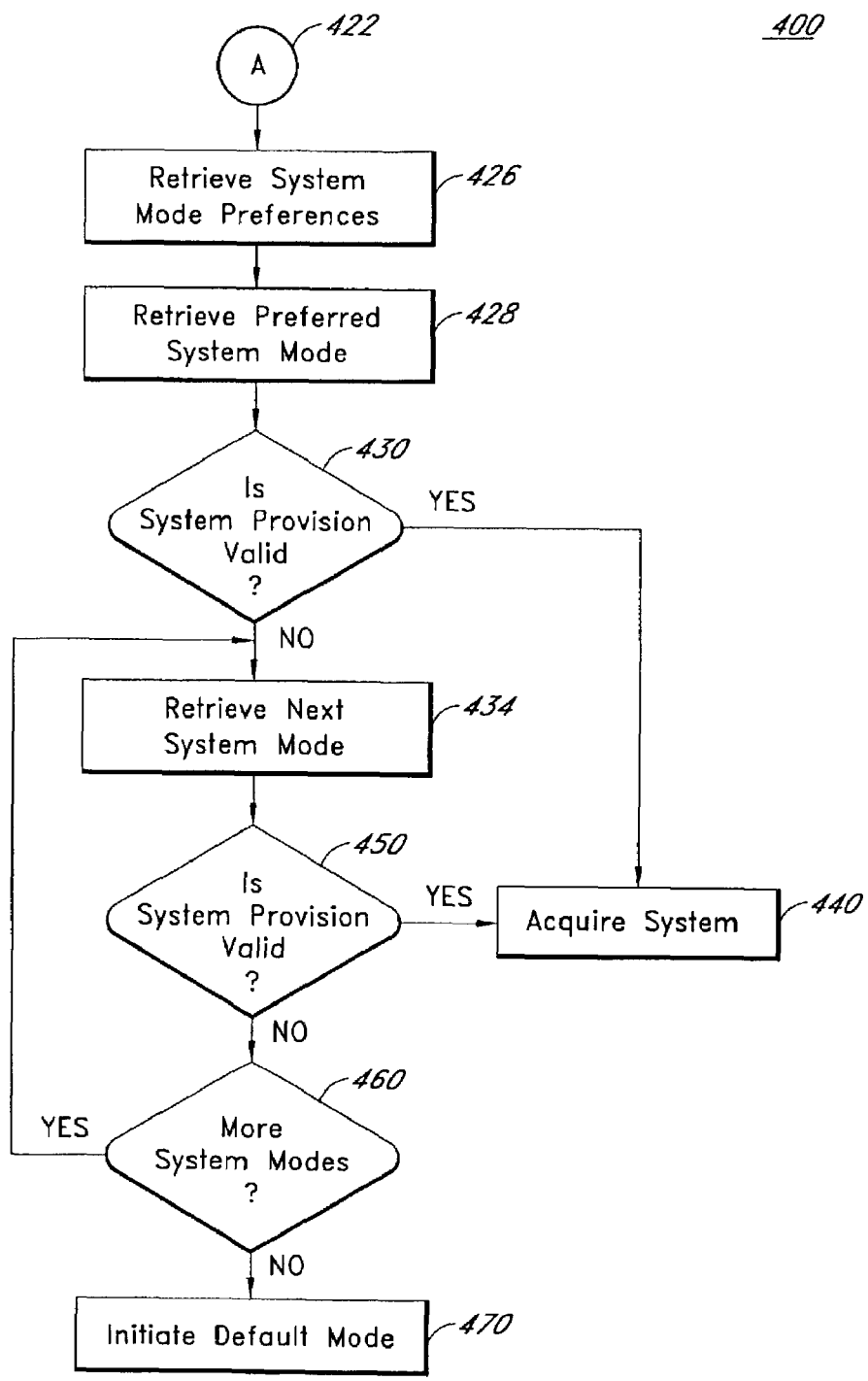

FIGS. 4A-4B show a flowchart of an alternative embodiment of a method 400 acquiring a communication system. The multimode device, using a processor and storage devices in communication with the processor, may perform this method 400 upon power up. The method 400 begins at block 402 where the multimode device determines which system modes are supported. This determination may be performed as part of the initial system start up functions by reading a stored list of supported system modes. The method 400 proceeds to block 408 where the multimode device determines what type of storage media is supported. The storage devices may, for example, include internal memory and external removable memory such as SIM and R-UIM. Each storage device may store one or more sets of system provision information.

The method 400 then proceeds to block 410 where the multimode device determines whether each storage media is functional. Although internal memory may be assumed to be functional, removable storage media, such as SIM or R-UIM, may be removed from the multimode device or may be damaged or otherwise non-functional. Thus far, the method 400 of FIG. 4A has effectively duplicated the method shown in FIG. 3.

The method 400 next proceeds to block 412 where a status table is initialized. The status table may be used to store the status of the multiple system provisions stored on the multiple storage devices accessible by the multimode device. Upon power up, the multimode device may initially set the status of each storage device to FALSE or invalid to show that system provision information within the storage device has not yet been validated.

After initializing the status table, the method 400 proceeds to validate the various system provision information and update the status table. The method proceeds to block 414 where the multimode device retrieves system provision information from memory. The multimode device may retrieve the system provision information according to a predetermined order. The predetermined order is not critical as the multimode device is updating the status table to be used in acquiring a system mode.

The method 400 then proceeds to block 416 where the multimode device determines if the retrieved system provision information is valid. At block 418, the status table is updated with the results of the validation process. The method 400 then proceeds to block 420 where the multimode device determines if there are more memory devices having system provision information.

If there are additional storage devices for which system provision information has not been validated, the method 400 returns to block 414 where system provision information from another storage device is retrieved.

However, if all system provision information has been retrieved and validated, the status table is complete and system mode acquisition may begin. System mode acquisition is performed in much the same manner as was described with respect to FIG. 3.

The method 400 proceeds to point 422. Point 422 is not a functional part of the method 400. Instead, point 422 is used as a connection point to illustrate the flow from the flowchart of FIG. 4A to the flowchart of FIG. 4B.

Continuing at point 422 at FIG. 4B, the method 400 proceeds to block 426 where the multimode device retrieves a list of system mode preferences. The system mode preferences may be in a predetermined location in memory and the act of retrieving the list may comprise addressing a pointer to a first location in the list. The system mode preferences determine the hierarchy that the multimode device uses in attempting to acquire a communication system. The system mode preferences may be stored in any of the storage media and may be entered by the user, service provider, or manufacturer.

Once the system mode preferences are retrieved, the method 400 proceeds to block 428 where the multimode device retrieves the preferred system mode. The system mode preferences indicate the order in which system mode acquisition should occur. The preferred system mode is the first system mode for which acquisition is attempted. At decision block 430, the multimode device determines whether the system provision indicated by the preferred system mode is valid. The multimode device may determine the validity of the system mode by referring to the status table. System modes that are valid are indicated as such in the status table. Thus, instead of retrieving the system mode provision and determining validity, the validity of the system mode is initially determined and the status saved in the status table.

If the system provision information is determined to be valid, the method 400 proceeds to block 440 where the multimode device acquires the system corresponding to the provision information.

If the system provision is determined not to be valid, the method proceeds to block 434 where the multimode device retrieves the next system mode from the list from the preferences list. The method 400 then proceeds to decision block 450 and the multimode device accesses the status table to determine if the corresponding system provision information is valid. If the system provision is determined to be valid, the method 400 proceeds to block 440 and the multimode device acquires the designated system. If, in decision block 450, the system provision is determined not to be valid, the method 400 proceeds to decision block 460.

In decision block 460, the multimode device determines if there are more system modes in the system mode preferences list. If there are more modes, the method 400 returns to block 434 and the multimode device retrieves and verifies the next system mode. If system provision information for all system modes have been found to be invalid, the method 400 proceeds to block 470 where the multimode device initiates a default operating mode. As discussed earlier, the default operating mode may be an emergency operation mode or may be a maintenance operation mode.

Thus, in contrast to the method of FIG. 3, the method of FIG. 4 instructs the multimode device to verify validity for all system provision information before attempting to acquire a particular system mode.

In a specific example, a multimode device supports two system modes, a CDMA mode and a GSM mode. The system provision information for the two modes may be stored on one or more storage devices. The storage devices may be internal to the multimode device or may removable storage devices such as SIM or R-UIM. The multimode device validates the system provision information stored on the one or more storage devices and updates a status table to indicate the validity of the system provision. The status table is stored within a storage device internal to the multimode device. The results may be stored in the status table as indicate in Table 1.

TABLE 1

| System Mode | Media | Validity | Status |
|---|---|---|---|
| CDMA | R-UIM | TRUE | Provisioned |
| GSM | SIM | FALSE | No media detected |

The status table indicates the presence of the two system modes and indicates the media from which the system provision information is retrieved. The status table also indicates the status of the validity check that was performed on the corresponding system provisioning information. As shown in Table 1, the CDMA system provision is valid as shown by the TRUE entry. The GSM system provision information is not valid, as shown by the FALSE entry in the status table.

The status table also shows that the CDMA system mode is currently provisioned and that the GSM system provision is not valid because no SIM media was detected as being inserted into the multimode device. The status table, of course, is not limited to this configuration and may have as many fields and indications as is desirable for a particular multimode device implementation.

Figure 5:
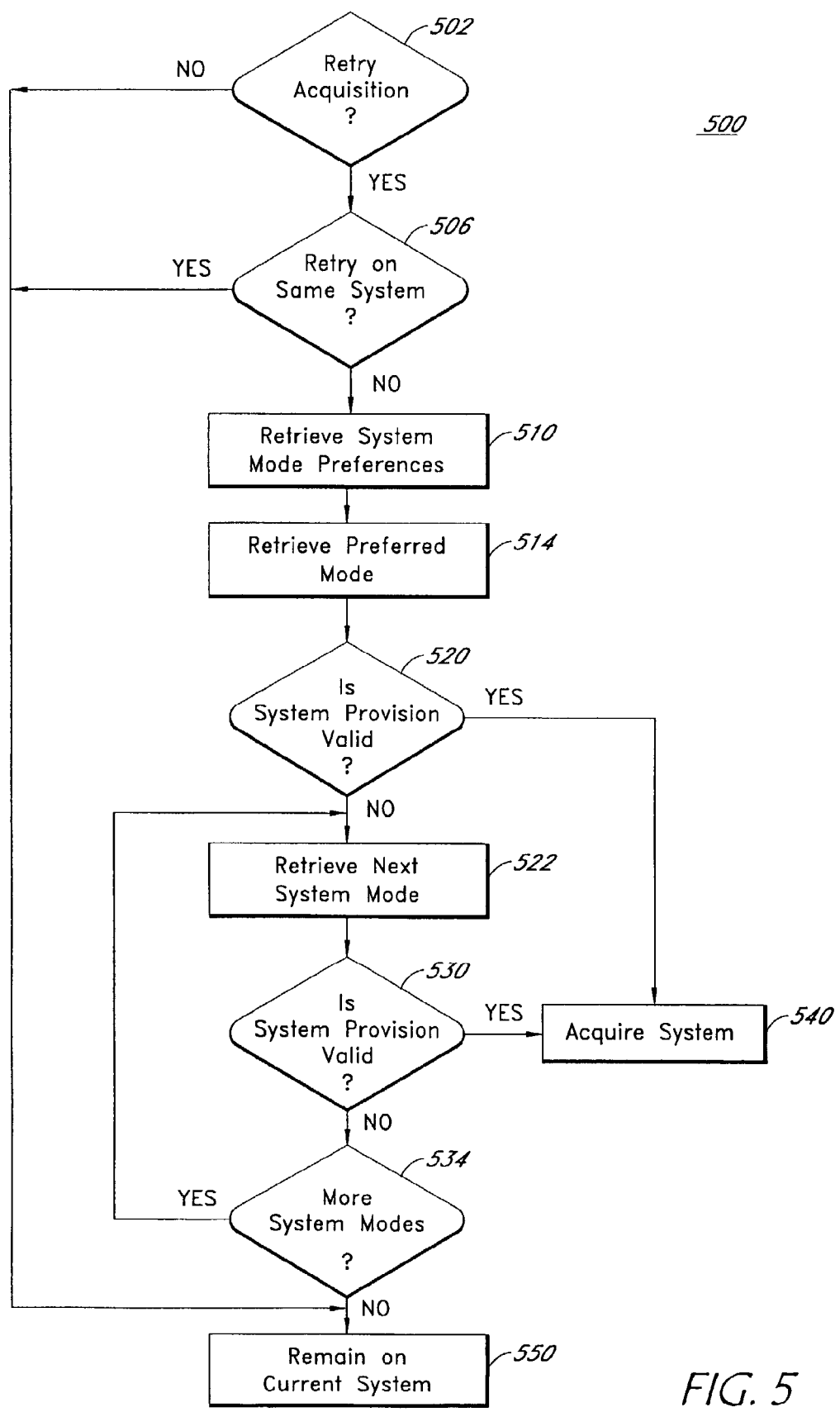
FIG. 5 is a flowchart showing an embodiment of a method of determining a communication mode after initially operating in a non-preferred mode.

FIG. 5 shows a flowchart of a method 500 of determining a communication mode after initially operating in a system mode. The system mode may be the preferred mode, a non-preferred mode, or a default mode.

The method 500 of FIG. 5 may be performed by the multimode device if the user preferred system is not acquired or if service in an acquired system is lost. Alternatively, the method 500 of FIG. 5 may be performed by the multimode device if the system mode preferences are changed or updated or if the user requests the multimode device to change system modes. The method 500 of FIG. 5 may also be performed if the status of storage media or system provision is changed such as when SIM or R-UIM is inserted or removed. For example, storage media may be removed or inserted into the multimedia device. Also, system provision information may be updated using over the air service provisioning (OTASP), over the air parameter administration (OTAPA), or over the air download. Additionally, a storage device may have an error on it that makes the system provision information unreadable.

The method, at decision block 502, initially instructs the multimode device to determine if system acquisition should be retried. As discussed above, system acquisition may be retried, for example, if the current system is lost, if there is a change in the status of the storage media, or if the system preferences change. If in decision block 502 the multimode device determines that retry is not necessary, the method 500 proceeds to block 550 where the multimode device remains on the current system. If acquisition is to be retried, the method 500 proceeds to decision block 506.

At decision block 506, the multimode device determines if acquisition should be retried on the same system or on a new system. Retry on the same system may be desired in the case where the system was most recently operating on the preferred system. Alternatively, the multimode device may prefer to acquire a new system where a less preferred system has been acquired and the system provision information for a more desirable system becomes valid. System provision information for a more preferable system may become valid for example when storage media is updated or replaced. Additionally, acquisition of a new system mode is desirable if there is currently no system acquired or the current mode is one of the default modes.

If the multimode device determines that retry on the same system is desired, the method 500 proceeds to block 550 where the multimode device remains on the same system. If a new system is desired, such as when a non-preferred system was previously acquired, the method 500 proceeds to block 510.

The multimode device determines which system to acquire. The multimode device performs many of the same steps shown in the method of FIG. 3. At block 510, the multimode device retrieves the system mode preferences. The method 500 then proceeds to block 514 where the multimode device retrieves the preferred mode. The method 500 may omit this step if the current system is the preferred system.

The method 500 proceeds to decision block 520 where the multimode device determines if the preferred system provision is valid. Again, the method 500 may omit this step if the current system is the preferred system. The manner in which the multimode device performs this step depends on whether validity of system provision information is stored in a status table or if validity of system provision information is to be determined after retrieving the system information for system mode acquisition. If a status table is used, the multimode device may retrieve the status of the system provision from the status table. If a status table is not used, the multimode device may determine the validity of system provision information just before acquisition of the system mode is attempted. The multimode device retrieves the system provision information from memory and determines if it is valid prior to acquiring the system. However, use of a status table does not prevent a method from validating system provision information just prior to a system acquisition attempt.

If the system provision information is determined to be valid, the method 500 proceeds to block 540 where the multimode device acquires the system. If, in decision block 520, the multimode device determines the system provision information is invalid, the method 500 proceeds to block 522.

In block 522, the multimode device retrieves the next system mode from the preference list. The method 500 may instruct the multimode device to omit retrieving the system mode corresponding to the current system. Thus, this step may be omitted if no other system modes are available. Alternatively, if the user of an application requests to go to a new system, only the system provision information corresponding to the requested system may be validated. If the system provision for a requested system mode is not valid, the multimode device may not verify any other system modes. The method 500 next proceeds to decision block 530.

In decision block 530, the multimode device determines if the system provision information is valid. If it is, the method 500 proceeds to block 540 where the multimode device acquires the system. If, in decision block 530, the system provision information is determined to be invalid, the method 500 proceeds to decision block 534.

In decision block 534, the multimode device determines if there are any more system modes in the system mode preference list. If there are, the method 500 returns to block 522 to where the multimode device proceeds to retrieve and validate the next system provision in the preference list.

If, in decision block 534, the multimode device determines that there are no more system modes in the preferences list, the method 500 proceeds to block 550. In block 550, the multimode device determines that it should remain on the current system. Alternatively, the multimode device may determine that one of the default modes is entered. However, since the multimode device may have performed the method 500 as a result of momentarily losing service in the current system, the preferred action may be to remain on the current system.

Thus, for example, the status of a storage medium may change. A user of a multimode phone may remove a SIM from the phone. The phone may be operating in a GSM mode corresponding to the system provision information stored in the SIM. The phone initiates the method 500 in order to determine that the current system provision is no longer valid. The method 500 may also direct the phone to acquire a different system corresponding to system provision information stored in another storage device, such as NV-RAM or R-UIM.

A method and device have thus been described where a device is able to support multiple operating modes in multiple systems by providing interfaces to multiple storage media. The storage media may each contain one or more sets of system provision information. The multimode device may retrieve, validate, and acquire a system from the plurality of systems according to a preference list or hierarchy. The hierarchy may be entered into a storage medium by the user, service provider, or manufacturer. The hierarchy may be stored in the multimode device or may be stored in a removable storage medium. The removable storage medium may be SIM or R-UIM.

Electrical and/or signal connections, couplings, and connections have been described with respect to various devices or elements. The connections and couplings may be direct or indirect. A connection between a first and second device may be a direct connection or may be an indirect connection. An indirect connection may include interposed elements that may process the signals from the first device to the second device.

Those of skill in the art will understand that information and signals may be represented using any of a variety of different technologies and techniques. For example, data, instructions, commands, information, signals, bits, symbols, and chips that may be referenced throughout the above description may be represented by voltages, currents, electromagnetic waves, magnetic fields or particles, optical fields or particles, or any combination thereof.

Those of skill will further appreciate that the various illustrative logical blocks, modules, circuits, and algorithm steps described in connection with the embodiments disclosed herein may be implemented as electronic hardware, computer software, or combinations of both. To clearly illustrate this interchangeability of hardware and software, various illustrative components, blocks, modules, circuits, and steps have been described above generally in terms of their functionality. Whether such functionality is implemented as hardware or software depends upon the particular application and design constraints imposed on the overall system. Skilled persons may implement the described functionality in varying ways for each particular application, but such implementation decisions should not be interpreted as causing a departure from the scope of the present invention.

The various illustrative logical blocks, modules, and circuits described in connection with the embodiments disclosed herein may be implemented or performed with a general purpose processor, a digital signal processor (DSP), an application specific integrated circuit (ASIC), a field programmable gate array (FPGA) or other programmable logic device, discrete gate or transistor logic, discrete hardware components, or any combination thereof designed to perform the functions described herein. A general purpose processor may be a microprocessor, but in the alternative, the processor may be any processor, controller, microcontroller, or state machine. A processor may also be implemented as a combination of computing devices, for example, a combination of a DSP and a microprocessor, a plurality of microprocessors, one or more microprocessors in conjunction with a DSP core, or any other such configuration.

The steps of a method or algorithm described in connection with the embodiments disclosed herein may be embodied directly in hardware, in a software module executed by a processor, or in a combination of the two. A software module may reside in RAM memory, flash memory, ROM memory, EPROM memory, EEPROM memory, registers, hard disk, a removable disk, a CD-ROM, or any other form of storage medium known in the art. An exemplary storage medium is coupled to the processor such the processor can read information from, and write information to, the storage medium. In the alternative, the storage medium may be integral to the processor. The processor and the storage medium may reside in an ASIC. The ASIC may reside in a mobile device, base station, or base station controller. In the alternative, the processor and the storage medium may reside as discrete components in a mobile device, base station, or base station controller.

The above description of the disclosed embodiments is provided to enable any person skilled in the art to make or use the invention. Various modifications to these embodiments will be readily apparent to those skilled in the art, and the generic principles defined herein may be applied to other embodiments without departing from the spirit or scope of the invention. Thus, the invention is not intended to be limited to the embodiments shown herein but is to be accorded the widest scope consistent with the principles and novel features disclosed herein.

What is claimed is:

1. A method of activating an operating mode of a wireless communication device having a plurality of operating modes, the method comprising:
    determining whether each of a plurality of storage devices is functional;
    initializing a status table, the status table storing status information for the system provision information stored on each of the plurality of functional storage devices;
    for each functional storage device, determining whether the system provision information stored on the functional storage device is valid;
    prior to attempting to acquire a system mode, updating the status table to indicate the validity of each system provision information by storing indicia of whether the system provision information is valid or invalid;
    retrieving a list of system mode preferences which indicates the priority order in which a system mode acquisition should occur;
    determining whether system provision information associated with a preferred system mode is valid by referring to the status table; and
    upon determining that system provision information associated with the preferred system mode is valid, acquiring a system corresponding to the preferred system mode.

2. The method of claim 1, further comprising:
    repeating the acts of determining whether system provision information is valid according to the priority order specified in the list of system mode preferences until a first of:
    the retrieved system provision is determined to be valid; or
    all system provision information has been retrieved and determined to be invalid.

3. The method of claim 1, further comprising:
    activating an emergency service operation mode all system provision information is determined to be invalid.

4. The method of claim 1, further comprising:
    activating a maintenance service mode if all system provision information is determined to be invalid.

5. The method of claim 1, wherein the list of system mode preferences is stored within a removable storage medium.

6. The method of claim 1, wherein the list of system mode preferences is stored within the wireless communication device.

7. The method of claim 1, wherein at least one piece of system provision information is stored in a first memory device of the wireless communication device, the first memory device comprising a non-volatile memory device within the wireless communication device.

8. The method of claim 7, wherein the first memory comprises removable storage media connected to the wireless communication device.

9. The method of claim 1, wherein at least one piece of system provision information is stored in a removable storage device connected to the wireless communication device.

10. The method of claim 9, wherein the removable storage device is a Subscriber Identification Module (SIM).

11. The method of claim 9, wherein the removable storage device is a Removable User Identity Module (R-UIM).

12. The method of claim 7, wherein at least one piece of system provision information is stored in a second memory device.

13. The method of claim 12, wherein the first memory device is distinct from the second memory device.

14. The method of claim 1, wherein the wireless communication device is a wireless phone.

15. The method of claim 1, wherein the plurality of operating modes comprises:
    a Global System for Mobile communications (GSM) mode; and
    a Code Division Multiple Access (CDMA) mode.

16. A wireless communication device having a plurality of operating modes, the wireless communication device comprising:
    means for determining whether each of a plurality of storage devices is functional;
    means for initializing a status table, the status table storing status information for the system provision information stored on each of the plurality of functional storage devices;
    for each functional storage device, means for determining whether the system provision information stored on the functional storage device is valid;
    means for updating the status table to indicate the validity of each system provision information by storing indicia of whether the system provision information is valid or invalid prior to attempting to acquire a system mode;
    means for retrieving a list of system mode preferences which indicates the priority order in which a system mode acquisition should occur;
    means for determining whether system provision information associated with a preferred system mode is valid by referring to the status table; and
    upon determining that system provision information associated with the preferred system mode is valid, means for acquiring a system corresponding to the preferred system mode.

17. One or more processor readable storage devices having processor readable code embodied thereon, the processor readable code for programming one or more processors to perform a method of activating an operating mode of a wireless communication device having a plurality of operating modes, the method comprising:
    determining whether each of a plurality of storage devices is functional;
    initializing a status table, the status table storing status information for the system provision information stored on each of the plurality of functional storage devices;
    for each functional storage device, determining whether the system provision information stored on the functional storage device is valid;
    prior to attempting to acquire a system mode, updating the status table to indicate the validity of each system provision information by storing indicia of whether the system provision information is valid or invalid;
    retrieving a list of system mode preferences which indicates the priority order in which a system mode acquisition should occur;
    determining whether system provision information associated with a preferred system mode is valid by referring to the status table; and
    upon determining that system provision information associated with the preferred system mode is valid, acquiring a system corresponding to the preferred system mode.

18. The wireless communication device of claim 16, further comprising:
    means for repeating the acts of determining whether system provision information is valid according to the priority order specified in the list of system mode preferences until a first of:
    the retrieved system provision is determined to be valid; or
    all system provision information has been retrieved and determined to be invalid.

19. The wireless communication device of claim 16, wherein at least one piece of system provision information is stored in a first memory device of the wireless communication device, the first memory device comprising a non-volatile memory device within the wireless communication device.

20. The wireless communication device of claim 16, wherein at least one piece of system provision information is stored in a removable storage device connected to the wireless communication device.

21. The wireless communication device of claim 20, wherein the removable storage device is a Subscriber Identification Module (SIM).

22. The wireless communication device of claim 20, wherein the removable storage device is a Removable User Identity Module (R-UIM).

23. The wireless communication device of claim 16, wherein the plurality of operating modes comprises:
    a Global System for Mobile communications (GSM) mode; and
    a Code Division Multiple Access (CDMA) mode.

24. The method of claim 1, wherein the status table includes a system mode field, a storage media filed, and a validity field.

25. The method of claim 1, further comprising:
    in response to the acquired system corresponding to the preferred system mode being lost from an inadequately received wireless transmission from the acquired system subsequent to its acquisition, re-acquiring the preferred system.

26. The method of claim 1, further comprising:
    receiving notification that a second system having a higher priority order in the list of system mode preferences than the acquired system as become available; and
    acquiring the second system.

27. The wireless communication device of claim 16, wherein the status table includes a system mode field, a storage media filed, and a validity field.

28. The wireless communication device of claim 16, further comprising:
    in response to the acquired system corresponding to the preferred system mode being lost from an inadequately received wireless transmission from the acquired system subsequent to its acquisition, means for re-acquiring the preferred system.

29. The wireless communication device of claim 16, further comprising:
    means for receiving notification that a second system having a higher priority order in the list of system mode preferences than the acquired system as become available; and
    means for acquiring the second system.

* * * * *

UNITED STATES PATENT AND TRADEMARK OFFICE
CERTIFICATE OF CORRECTION

PATENT NO. : 7,646,737 B2
APPLICATION NO. : 10/211192
DATED : January 12, 2010
INVENTOR(S) : Guangming Carl Shi It is certified that error appears in the above-identified patent and that said Letters Patent is hereby corrected as shown below:

On the Title Page:

The first or sole Notice should read --

Subject to any disclaimer, the term of this patent is extended or adjusted under 35 U.S.C. 154(b) by 90 days.

Signed and Sealed this

Twenty-eighth Day of December, 2010

David J. Kappos
*Director of the United States Patent and Trademark Office*